June 21, 1949.  O. H. SCHUCK  2,473,974
UNDERWATER SOUND DETECTING AND INDICATING SYSTEM
Filed May 18, 1944  3 Sheets-Sheet 1
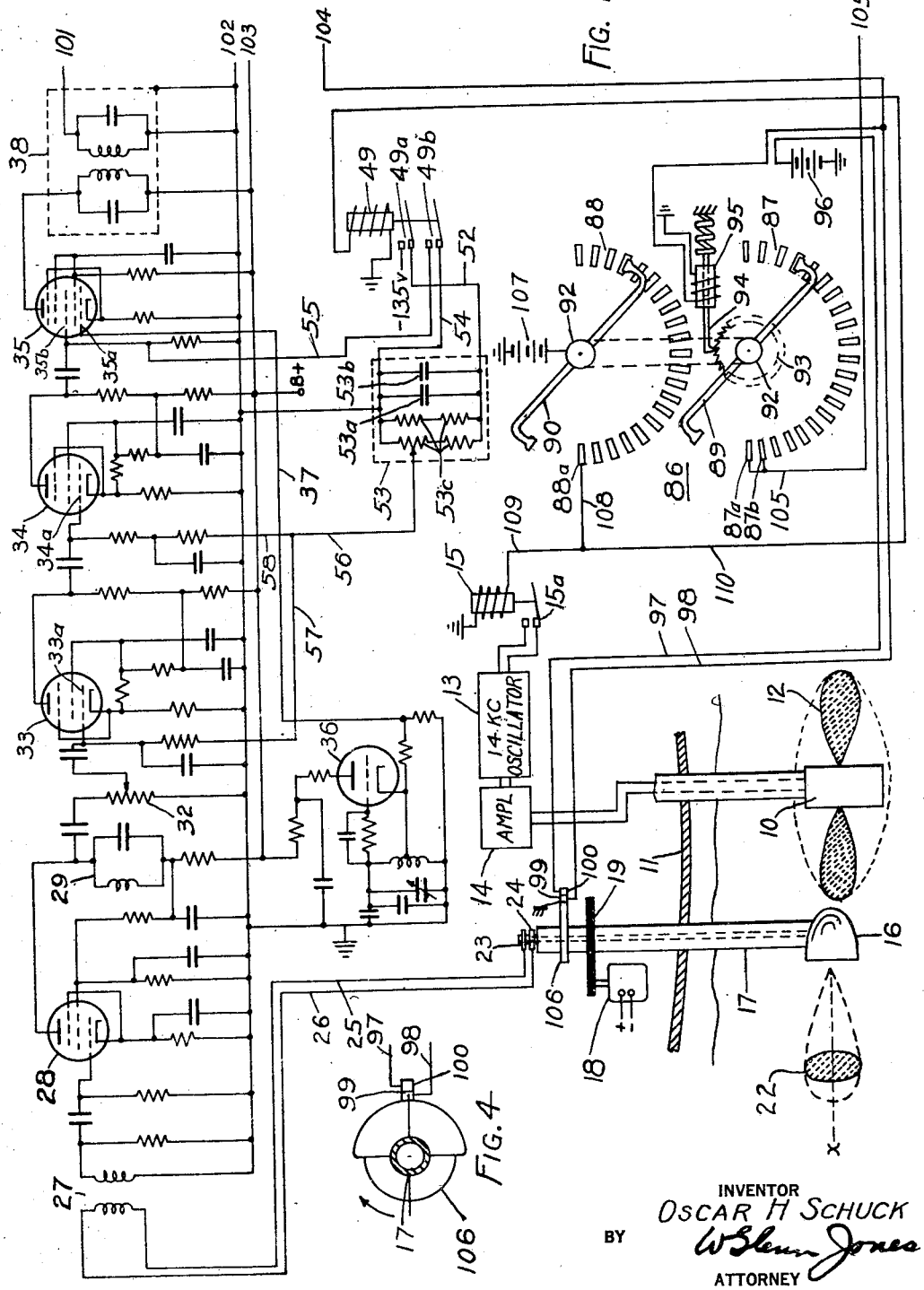
INVENTOR
OSCAR H SCHUCK
BY W Glenn Jones
ATTORNEY June 21, 1949. O. H. SCHUCK 2,473,974
UNDERWATER SOUND DETECTING AND INDICATING SYSTEM
Filed May 18, 1944 3 Sheets-Sheet 2
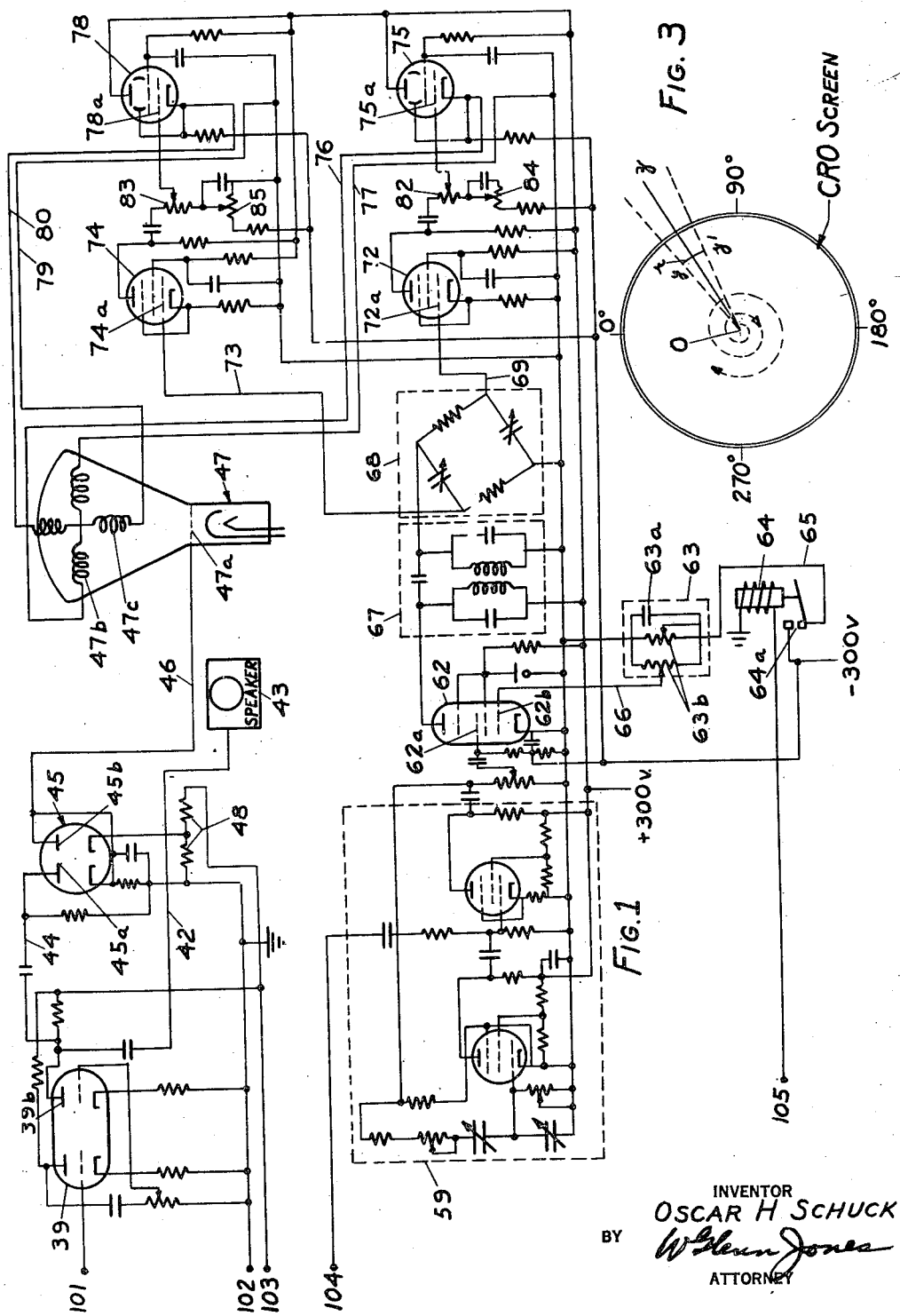
INVENTOR
OSCAR H SCHUCK
BY
ATTORNEY June 21, 1949.    O. H. SCHUCK    2,473,974
UNDERWATER SOUND DETECTING AND INDICATING SYSTEM
Filed May 18, 1944    3 Sheets-Sheet 3
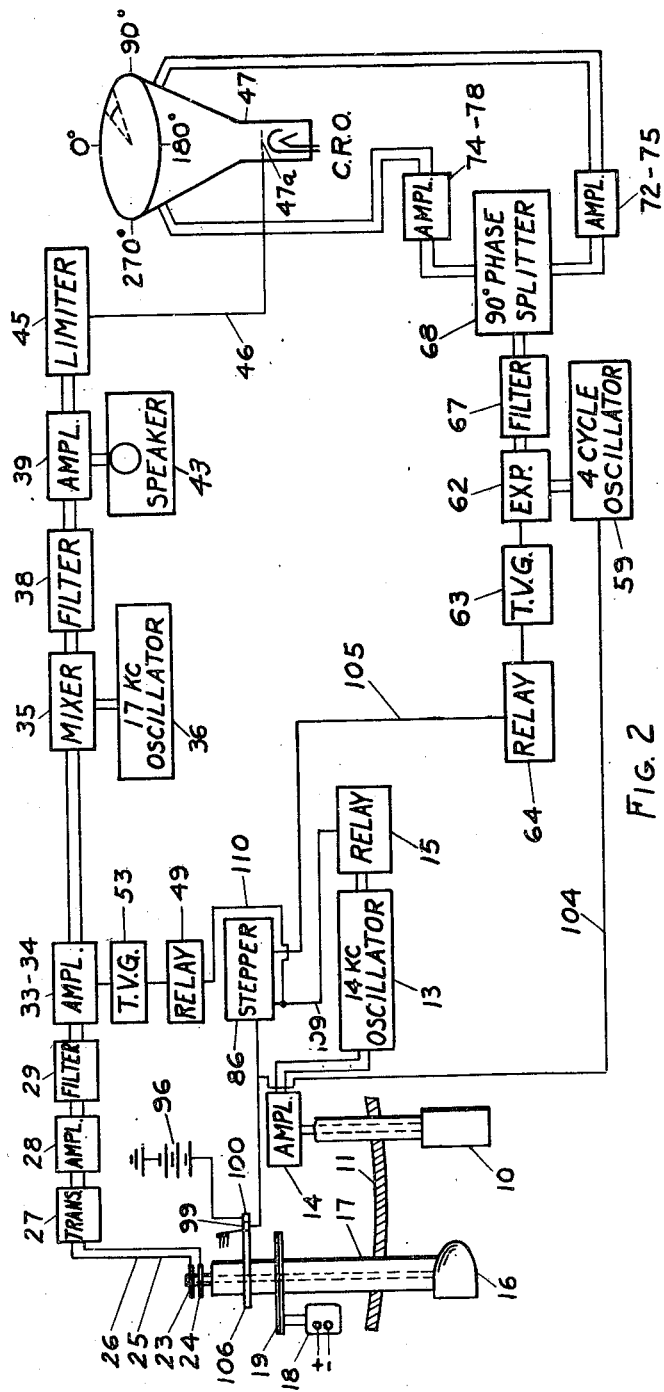
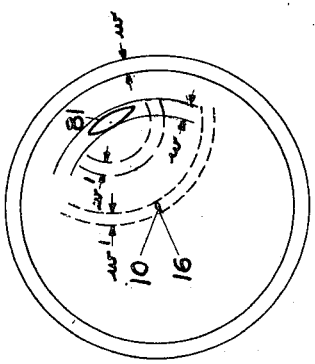
Fig. 5
INVENTOR
OSCAR H. SCHUCK
BY
ATTORNEY Patented June 21, 1949

2,473,974

UNITED STATES PATENT OFFICE 2,473,974

UNDERWATER SOUND DETECTING AND INDICATING SYSTEM

Oscar Hugo Schuck, Belmont, Mass., assignor to the United States of America as represented by the Secretary of the Navy Application May 18, 1944, Serial No. 536,172

12 Claims. (Cl. 177—386)

This invention relates to apparatus for determining the bearing and/or range of a source of wave energy and is particularly directed although not limited, to a determination of the bearing and/or range of a source of compressional wave energy.

The invention is of especial utility in underwater sound echo-ranging systems and is described in this connection in the following specification. However, it should be obvious that the principles of the invention are equally applicable in conjunction with other forms of wave energy bearing and/or range finding systems.

To fully appreciate the difference between this system and those of the prior art, it will be advantageous here to describe a typical underwater sound echo-ranging system of such prior art. In the latter system, intermittent pulses or pings of compressional wave energy are projected from a transducer, usually of the type having magnetostrictive or piezoelectric elements, which is carried underwater by the searching vessel.

The design characteristics of the transducer are such that the energy is projected therefrom in a relatively narrow, conical beam, the axis of the beam usually being substantially horizontal. The energy is usually at supersonic frequency although it may be otherwise and is commonly referred to in the art as "sound" even though it be above the normally audible range.

The transducer is mounted for rotation and the operator thus searches around the entire underwater horizon in steps for targets. At each step, the operator sends out a pulse and then waits for a certain length of time to see whether or not any echo is heard. If no echo is heard, the transducer is turned slightly and the process repeated.

When the energy pulse strikes an underwater target such as a submarine, it is reflected or echoed back to the transducer, the latter now being connected to act as an energy receiver. The energy pulse impinging upon the elements of the transducer generates electromotive forces therein and these latter are used to give audible and/or visual indications to the operator. The operator by noting the bearing of the transducer at which an echo is received will know that a target lies somewhere along such bearing.

The speed of supersonic wave energy in water is substantially constant at about 1600 yards per second. Thus the range of a target may be computed from the time required by the energy pulse to travel from the transducer to the target and back again.

The type of transducer construction currently used for underwater work is directionally selective but the main lobe of its directivity pattern is nevertheless relatively flat in the area of maximum sensitivity. Because of this, the operator, when an echo comes in, trains the transducer from side to side on successive pings until he loses the echo on one side and then on the other. Noting the cut-off bearing on each side of the target, the correct bearing is taken as the mean between the two. Usually above five or six pings are required for one bearing determination.

The pings may be timed for any particular range such as for example 2000 yards; that is, spaced to permit the echo of a ping to return from a target within a 2000 yard range before the next ping is sent out. Thus, if the operator searches the entire underwater area at a 2000 yard range, 6° at a trial, sixty pings are required. If three seconds are allowed for training, pinging and listening, such a search would require three minutes. At a 5000 yard range, six or seven minutes would be required.

A conspicuous shortcoming of the search procedure described above is that only a very small part of the region within acoustical range of the searching vessel is covered at any one time. The need for continual change of projector bearing calls for considerable skill and effort on the part of the operator. If any sound is heard which might be an echo, time is required to ping several times in that particular direction and this results in incomplete coverage of other portions of the area which should be within reach. After contact is obtained, the skill of the operator is put to further test in maintaining contact, and if cut-on procedure is used, both range and bearing data are obtained at intervals which are disproportionately long compared to the brief time available for attack.

In contrast to the search procedure, my improved apparatus, which will be described in detail hereinafter, is one in which the entire underwater horizon is scanned substantially simultaneously thus enabling the operator to detect the presence of one or any number of underwater targets at any bearing relative to the ship on which the apparatus is located, and in which the range of such a target is likewise indicated instantaneously to the operator.

Some of the advantages inherent in my novel scanning system over the search system previously described are as follows:

(1) Sensitivity in all directions is obtained substantially simultaneously. This greatly increases the effectiveness of searching out an underwater target. Present statistics indicate that only between a twelfth and one-fifth of all possible contacts are actually made utilizing the conventional search procedure. Therefore, a scanning system which is sensitive in all directions should serve to clearly increase this fraction.

(2) Continuous information on both the range and bearing of all targets in the underwater field relative to the ship upon which the apparatus is installed is presented on the screen of a cathode ray oscilloscope.

(3) Operation of the scanning system is much simpler than operation of the search system.

In the present improved system, the pulse transmitter is a transducer, the design of which is such that wave energy is propagated simultaneously in all directions in a horizontal plane and with substantially equal intensity in all directions. The transducer thus has an omnidirectional characteristic. The wave energy is emitted periodically from the transducer for a pulse period of T seconds. Thus the pattern of the wave energy in plane is an annulus having a width equal to the distance the energy travels through the water in T seconds and of steadily increasing circumference.

The returning echo is picked up by a transducer, the design characteristics of which are such that the transducer is directionally sensitive. This receiver rotates at a rate of one revolution in T seconds. Therefore, at some time during the duration time of the returning echo, the directivity pattern of the receiving transducer will be pointed in the direction from which the echo is coming. A cathode ray oscilloscope tube with a spiral beam sweep synchronized with the rotating receiver is utilized in the system and connections to the tube elements are such that the spirally sweeping beam spot will brighten when an echo is received. Thus the bearing of the beam spot when it brightens relative to the center of the tube screen is always the same as the bearing of the receiver directivity pattern at which the echo pulse is received. The distance of the brightened spot from the center may be calibrated in terms of target range since a spiral sweep begins with each energy pulse transmitted and increases in size directly with time after emission of the pulse. The beam spot therefore brightens at a point or points corresponding to the range and bearing of each underwater object from which an echo is reflected. A long persistence screen is used to allow easy observation of the bright spots.

If the pulse period T is .25 second, the receiver directivity beam will be set to rotate four times per second and is therefore able to search the entire underwater horizon at this rate which is obviously much faster than the conventional system described hereinabove can be operated. Furthermore, by use of the cathode ray oscilloscope, it is now possible to visually indicate simultaneously any and all targets which may lie within a particular range at one or more different bearings relative to the ship on which the apparatus is carried.

It is therefore a primary object of this invention to provide a new and improved system for continuously and expeditiously indicating the bearing and range of any and all targets in a field.

Another object is to provide an improved apparatus for determining the bearing of one or more targets in an underwater field which includes a representation of the field, a transducer for sending out a pulse of wave energy, a directionally sensitive transducer for scanning the underwater field to pick up an echo from the target and indicating means for sweeping the field representation synchronously with operation of the scanning transducer to produce on the representation an indication for each target echo received and the bearing of such target.

Another object of this invention is to provide a system for continuously observing the range and bearing of one or more targets in a field which system includes a representation of the underwater field, transducer means for projecting a pulse of compressional wave energy into the field, the projected energy being of substantially uniform intensity in a horizontal plane, directionally sensitive transducer means which scan the field for picking up an echo of the energy from a target, and indicator means which spirally sweep the field representation synchronously with operation of the scanning transducer means and produce thereon an indication when an echo is received corresponding to the bearing and range of the target.

Still another object of the invention is to provide means to scan an underwater horizon continuously for sources of noise apart from echoes originating as the result of a transmitted pulse.

These and other objects of the invention will become more apparent from the detailed description which now follows and from the accompanying drawings which represent a preferred embodiment of the invention.

Referring now to the drawings,

Fig. 1 is a circuit diagram of my improved underwater sound detecting and indicating system;

Fig. 2 is a block diagram of the circuit components of the system;

Fig. 3 is a view showing how the range and bearing of a target appears on the oscilloscope screen which is a representation of the underwater field;

Fig. 4 is a plan view of the cam and contacts operated thereby for controlling the operation of certain of the system components; and Fig. 5 is a plan view of an underwater field showing the nature of the compressional wave energy as emitted by the sending transducer employed in the system and the reflection of such energy from an underwater target.

Referring now to Figs. 1 and 2, a transducer 10 for sending out compressional wave energy preferably of supersonic frequency, is shown projecting down into the water through a ship's hull 11. This transducer is stationary and its design characteristics are such that when it is in operation, the compressional wave energy is emitted therefrom with substantially equal, and relatively great intensity in a horizontal plane. The intensity in the vertical plane is but very little when compared to that in the horizontal plane and the overall intensity pattern is therefore toroidal as indicated by reference character 12.

Construction of transducer 10 per se does not form a part of this invention and hence it has not been shown in detail. A magnetostrictive unit of the general type shown in application Ser. No. 519,233, filed January 21, 1944, by Francis P. Bundy, now Patent No. 2,431,026, granted November 8, 1947, is satisfactory for this purpose. Another type of transducer construction which is satisfactory is shown in application Ser. No. 497,232, filed August 3, 1943, by Edwin M. McMillan et al., the latter being a piezoelectric unit.

Transducer 10 is driven from an oscillator 13 of conventional construction, the output of which may be put through an amplifier 14, also of conventional construction, before it is fed into transducer 10.

Oscillator 13 is caused to operate intermittently for predetermined periods by means of a relay 15, the operation of the latter being explained hereinafter in more detail.

Echoes of compressional wave energy emitted from transducer 10 are received by a second transducer 16 which also projects through the ship's hull 11. Transducers 10 and 16 are preferably located very close to each other in space and thus, for purposes of this invention, may be considered as being located on the same vertical axis.

The receiving transducer 16 is mounted upon shaft 17, the latter being adapted to be rotated by a motor 18 which may be coupled to shaft 17 by a belt drive 19.

Receiving transducer 16 is of such design that its intensity pattern 22 has a single major and relatively narrow lobe, the axis $x$ of which is perpendicular to the shaft 17 and the active face of the transducer. That is to say transducer 16 is most sensitive to wave energy coming in along the $x$ axis.

The construction of receiving transducer 16 per se is not a part of this invention and has, therefore, like sending transducer 10, been shown only in general outline.

It may be said, however, by way of general explanation that the desired directional sensitivity is obtained by making the area of the active face of the transducer large with respect to the wave length of the wave energy utilized, and by having all points of this face vibrate in phase, although not necessarily with equal amplitude. One suitable construction of a magnetostrictive transducer is shown in U. S. Patent No. 2,063,952, issued December 15, 1936, to R. L. Steinberger.

The active elements of transducer 16 are connected together and brought out by conductor means to two slip rings 23, 24. Conductors 25, 26 lead from slip rings 23, 24 to an input transformer 27 of the receiver. The incoming echo is then amplified in amplifier 28 into a filter group 29. It next passes through an attenuator 32 and from there into two more electronic amplifier stages 33, 34.

The incoming or echo signal is about the same frequency as that of the emission from sending transducer, it being noted that this signal will, of course, have a certain amount of shift in frequency due to the Doppler effect caused by motion between the vessel upon which the transducers 10 and 16 are mounted and that of the underwater target. The echo signal is then beat in a mixer stage 35 against an output signal from an oscillator 36 of conventional design. The output from oscillator 36 feeds over conductor 37 into a control grid 35a of mixer 35.

In the particular system disclosed, the frequency of oscillator 13 is set to 14 kc. and that of oscillator 36 set of 17 kc. Thus the difference frequency output from mixer 35 which will be at approximately 3 kc. is fed through a 3 kc. band pass filter 38 and into a double triode 39 from the second plate 39b of which the signal is taken over conductor 42 to a loudspeaker 43 whereby the echo signal may be heard by an operator.

The incoming echo signal is also fed over conductor 44 into a double diode limiter 45 and thence over conductor 46 to the signal grid 47a of a cathode ray oscilloscope 47, the screen of which serves as a representation of the target field.

Signals below a predetermined level will reach conductor 46 through the left half 45a of limiter 45 while signals that are above this level come back through the right half 45b of limiter 45 to ground, half 45b being biased through a resistor 48.

It is desirable to block out the receiver portion of the system while the sending transducer 10 is in operation and also for a short time thereafter. Otherwise the signals which would be picked up by receiving transducer 16 direct from transducer 10 and from the intense reverberation which follows immediately at the end of each transmission of a pulse of compressional wave energy would damage the elements of the oscilloscope 47. Also by suppressing reverberation, a true echo of the wave energy from a target may be more easily distinguished on the oscilloscope screen.

This desired effect is accomplished by applying a high negative voltage, about −135 volts from a suitable source through contacts 49a of relay 49 when energized, conductor 52, a time varied gain network 53 (labeled TVG in the block diagram, Fig. 2), conductor 54, relay contacts 49b and conductor 55 to a control grid 35b of mixer 35. Control for relay 49 will also be explained hereinafter in more detail.

Also at the time relay 49 is energized, capacitors 53a, 53b of the network 53 are charged to −135 volts from this same source. This potential is applied through conductors 56, 57 and 58 to the control grids 33a and 34a of amplifiers 33 and 34 respectively. However, when relay 49 opens, the charge on capacitors 53a, 53b will gradually leak off through resistor set 53c of the network 53, the time constant for condenser discharge being of course dependent upon the resistance of the resistor set 53c. Amplifiers 33 and 34 are therefore unblocked at the same rate as the discharge of capacitors 53a and 53b so that by the time an echo of the transmitted energy pulse is received, the normally high gain of amplifiers 33, 34 is restored. Thus amplifiers 33, 34 yield a time varied gain.

In this system, the beam spot of the cathode ray oscilloscope 47 is caused to make periodic spiral sweeps, each such sweep beginning at the center of the oscilloscope screen when the energy pulse is sent out from transducer 10 and expanding outwardly to the edge of the screen.

The apparatus for effecting this spiral sweep comprises in the present instance a 4 cycle RC square wave generator or oscillator 59. The output from oscillator 59 feeds into control grid 62a of an expander tube 62. The gain of tube 62 is controlled through a second time varied gain network 63 and relay 64. Operation of relay 64 which is periodic will be explained in further detail hereinafter. However, with relay 64 closed, a negative potential from a source labeled −300 v. is applied through relay contacts 64a, conductor 65, network 63 and conductor 66 to a control grid 62b of tube 62 to thereby reduce the gain of this tube to substantially a zero value. Condenser 63a of network 63 is also charged at this time.

When relay 64 opens, condenser 63a will begin to discharge through resistor 63b which gradually increases the gain of tube 62. This periodic application of time varied gain of the output of oscillator 59 in expander 62 causes the beam spot of the oscilloscope 47 to periodically expand outwardly from the center of the oscilloscope screen as shown clearly in Fig. 3.

From expander 62 the 4 cycle oscillator output is passed through a band pass filter 67 tuned to 4 cycles and is then put through an RC bridge network 68 which functions to split the 4 cycle output into two components 90° apart in phase.

A first component of the oscillator output is taken out of the bridge network 68 via conductor 69 to grid 72a of a power amplifier 72. Similarly a second component of oscillator output (now 90° out of phase with the first component) is taken out of the other side of the bridge network 68 via conductor 73 to grid 74a of power amplifier 74.

The output from amplifier 72 is then fed into the control grid 75a of tube 75, in the cathode circuit of which is connected via conductors 76, 77, the horizontal set of beam deflecting coils 47b of the oscilloscope 47. Similarly the output from amplifier 74 is fed into control grid 78a of tube 78, in the cathode circuit of which is connected via conductors 79, 80, the vertical set of beam deflecting coils 47c of oscilloscope 47.

This 2 phase output of oscillator 59 with time varied gain through expander 62 gives the desired spiral sweep to the beam spot.

Potentiometers 82, 83 between tubes 72, 75 and 74, 78 respectively serve as volume controls. Potentiometers 84, 85 similarly located function as a centering control for the electron beam spot on the screen of the oscilloscope 47.

As stated in the opening portion of this specification, compressional wave energy is emitted periodically from transducer 10 in a horizontal plane and with substantially equal intensity in all directions in that plane for a pulse period of T seconds. Referring now to Fig. 5, the pattern of the wave energy is thus an annulus having a width $w$ equal to the distance the energy travels in the water in T seconds and of steadily increasing circumference.

The direction sensitive receiving transducer 16 makes one complete revolution in T seconds. Therefore since the echo of the pulse returning from an underwater target such as a submarine 81 also has a width $w'$ equal to the distance the energy travels in the water for T seconds, the active face of receiving transducer 16 will at one instant be pointed in the direction of the target while the echo annulus $w'$ is passing through transducer 16 and will thus pick up the echo pulse feeding it into the receiver and ultimately onto the brightening grid 47a of the oscilloscope 47. In this particular embodiment, T is made equal to .25 second. Therefore motor 18 is so arranged that transducer 16 rotates at a rate of four revolutions per second.

For periodically energizing the sending transducer 10, this system makes use of a stepping mechanism 86 which comprises two contact sets 87, 88 of 21 contacts each, the contacts being spaced equally in a half circle. These contacts are wiped by double contact arms 89, 90 which rotate together on a common shaft 92. A ratchet gear 93 is fixedly mounted upon shaft 92. Coacting with gear 93 is an arm 94 which moves transversely when solenoid 95 is energized. Travel of arm 94 is such that arms 89, 90 will move up one contact on the contact sets 87, 88 each time that solenoid 95 is energized. The latter is periodically energized from a suitable source 99 through conductors 97, 98 and contacts 99, 100 which are closed periodically by means of a cam 106 fixedly mounted on shaft 17, this being clearly shown in Fig. 4. Cam 106 has a 180° land. Hence contacts 99, 100 will be closed for one-eighth second on each revolution of shaft 17 since the latter, as previously described, rotates at 4 revolutions per second or one complete revolution each quarter second.

Thus solenoid 95 is energized once for each revolution of shaft 17 and hence arms 89, 90 of the stepping mechanism 86 will step up one contact on the contact sets 87, 88, for each revolution of shaft 17.

Or to put it another way, arms 89, 90 remain on each contact for one-quarter second. It will thus be apparent that for each 20 impulses of current applied to solenoid 95 by the make and break between cam operated contacts 99, 100 either the top or bottom portion of arm 90 will make contact with the extreme left hand contact 88a of contact set 88. When this happens, a potential from source 107, one side of which is grounded, is applied through shaft 92, arm 90, contact 88a, and conductors 108, 109 to the winding of relay 15. The winding of relay 49 is also energized at this time by a branch conductor 110.

In a similar manner, when arm 89 makes contact with contacts 87a, 87b of the contact set 87, the potential from source 107 is applied through arm 89, contacts 87a, 87b, and conductor 105 to the winding of relay 64.

Also each time that contacts 99, 100 close, the potential from source 96 is applied over conductor 104 to oscillator 59 and functions as a synchronizing pulse for synchronizing the turns of the spiral sweep of the beam spot with those of the receiving transducer 16.

*Operation*

Transducer 16 is set into rotation by the motor 18 at a speed of 4 revolutions per second. Contacts 99, 100 are then closed once in each revolution of shaft 17 by the cam 106, and upon each such closure of these contacts, arms 89, 90 of the stepping mechanism 86 are moved successively from contact to contact of the contact sets 87, 88.

When contact arm 89 reaches contact 87b, relay 64 will pull in and close its contacts 64a whereupon the negative potential of −300 volts will be applied to a blocking grid 62b of expander 62 thereby reducing the gain of the output of oscillator 59 to substantially a zero value at this time. The same condition also holds true as contact arm 89 passes to contact 87a.

Next, when contact arm 90 reaches contact 88a, relays 15 and 49 pull in and close their contacts. Closure of contacts 15a of relay 15 connects the output of oscillator 13 through amplifier 14 to the transducer 10 and a pulse of compressional wave energy, which is substantially uniform in all directions in a horizontal plane, is emitted for a period of one quarter second, this being the time period for which relay 15 remains closed. Thus, an annulus of compressional wave energy having a width $w$ equal to the distance that the energy travels through the water in one quarter second (approximately 400 yards) as shown in Fig. 5 spreads out from transducer 16.

As relay 49 pulls in, a negative potential of about —135 volts is applied to the grids 33a, 34a of amplifiers 33, 34 and thereby prevents energy emitted directly from transducer 10, which will obviously be picked up by the receiving transducer 16, from getting through the receiver portion of the system. As previously described, this is desirable to prevent damage to elements of the cathode ray oscilloscope 47.

As arms 89, 90 pass out of engagement with contacts 87a, 88a, respectively, relays 15, 49 and 64 are deenergized and their contacts are thereby opened.

Opening of the contacts of relay 15 disconnects the output of oscillator 13 from transducer 10 thereby stopping the emission of the compressional wave energy.

Opening of the contacts of relay 49 removes the maximum blocking potential which was placed on the grids 33a and 34a of amplifiers 33 and 34 and substitutes a blocking potential, the value of which decreases with time in accordance with the rate of discharge of condensers 53a, 53b through resistor set 53c of the time varied gain network 53. Immediately after the termination of emission of compressional wave energy from transducer 10, the gain of amplifiers 33, 34 are much reduced and therefore the intense reverberation of such energy which follows will have little effect upon the cathode ray oscilloscope. However, the blocking action of condensers 53a, 53b upon amplifiers 33, 34 gradually decreases and thus by the time an echo arrives, the normally high gain of these amplifiers is at least partially restored and the echo signal will thus pass through amplifiers 33, 34 and be relatively unaffected by the time varied gain just described.

As relay 64 opens its contacts, the 4 cycle output from oscillator 59 will begin to flow through the expander 62, increasing with time as determined by the unblocking of tube 62 through the discharge of condenser 63a of the time varied gain network 63. This 4 cycle output of increasing intensity then passes through filter 67, and is split into two components 90° apart in phase, one component then being fed onto the horizontal beam deflecting coils 47b of the oscilloscope 47 and the other component being fed onto the vertical beam deflecting coils 47c of this oscilloscope.

The effect is to produce a spiral sweep of the beam spot in the oscilloscope as shown in Fig. 3, the spiral beginning at or near its center simultaneously with the opening of relay 64. It is evident that this spiral sweep of the beam spot is not visible on the screen of the oscilloscope since no potential is applied to the brightening grid 47a of the oscilloscope until an echo is received.

Synchronism between consecutive turns of the spiral sweep of the beam spot and turns of the receiver transducer 16 is maintained by impulses which are applied from source 96 upon each closure of contacts 99, 100, to oscillator 59 via conductor 104 as previously described.

Referring now to Fig. 5, when the annulus of wave energy having the width $w$ emitted from transducer 10 strikes an underwater target 81, it is reflected therefrom, the target 81 now serving as a source of the reflected energy which will likewise be an annulus of width $w'$ and of increasing circumference. As previously described, at some time during the duration time that the reflected energy is passing the receiving transducer 16, the directivity pattern 22 thereof shown in Fig. 1 will be pointed in the direction from which the echo is coming. This energy will therefore be picked up by transducer 16 and put through the receiver portion of the system, appearing in the output of limiter 45 as a potential which is impressed upon the brightening grid 47a of the oscilloscope 47 causing the spirally sweeping beam spot which has been expanding outwardly during this time to brighten over a relatively narrow path for a short distance $y$—$y'$ as shown in Fig. 3. Thus since the spiral sweep of the beam spot is synchronized with rotation of the receiving transducer 16, the bearing at which the brightening of the beam spot appears upon the screen will be the same as the bearing of the transducer 16 at the instant the echo was received from target 81. The true bearing of target 81 therefore will be a bearing which is the mean $Oz$ of the distance $y$—$y'$ which represents brightening of the beam spot.

Since the expansion spirally of the beam spot from the center O of the oscilloscope screen increases directly with time after the pulse of wave energy is sent out from transducer 10, the distance $Or$ on the oscilloscope screen is directly proportional to the time required for the wave energy to travel from transducer 10 to the target 81 and return therefrom to transducer 16. Range of the target 81 from the transducers 10, 16 may thus be indicated directly on the screen by suitably calibrating its face.

In the system which has been described, there are 20 stepping operations over each of the contact sets 87, 88. Therefore, since arms 89, 90 step up one contact each quarter second, the energy transmitting transducer 10 will send out a pulse of wave energy each 5 seconds. Compressional wave energy travels through water at a speed of approximately 1600 yards per second. Allowing one half of the time interval between successive periods of energy transmission by transducer 10 (equal to 2½ seconds) as the maximum time over which any echo may be received before the next impulse is sent out, it will be seen that the present system has a theoretical effective range of 4000 yards. However, the maximum range is only about 3600 yards because in the present system, the sweep of the beam spot over the oscilloscope screen will expand spirally for only a 4¾ seconds period at which time relay 64 again becomes energized (due to contact between arm 89 and contact 87b) to again place the negative blocking potential on the grid 62b of tube 62 which causes the beam spot to fly back to the center of the oscilloscope screen. Tranducer 10 is again energized and the cycle repeated.

Through adjustment of potentiometers 82, 83, the spiral sweep of the beam spot is preferably made to reach the the outer edge of the oscilloscope screen just before fly-back occurs.

The effective range of the system may of course be varied by changing the number of contacts on the stepping mechanism 86. Thus for a lesser range, mechanism 86 might count 10 steps instead of 20 as in the present embodiment.

It should be noted that in the present system, an indication of an echo is obtained while the annulus $w'$ of the reflected wave energy is passing through the receiving transducer 16 and that this annulus has a width corresponding to the distance that the energy travels through the water in one quarter second, the time required for a complete rotation of the receiving transducer 16 and a complete turn of the spiral sweep of the beam spot on the screen of the oscilloscope. At some time during this one quarter second period, the annulus w' is caught momentarily but it will be evident that it is not known which part of the annulus is so caught. The indication will be the same whether the front or rear of the annulus is caught. The velocity of this energy being about 1600 yards per second, the energy will traverse about 200 yards out and 200 yards back in one quarter second. Each one quarter second increment of time between a particular instant of transmission of energy from transducer 10 and the receipt of its echo by transducer 16 means about a 200 yard increment in the target distance. Therefore, knowing the radial distance on the screen of the oscilloscope from the center to the spot at which the electron beam brightens, the distance to the target inferred therefrom is subject to an error up to ±100 yards.

The system is not therefore capable of giving the exact range but will give an approximate range which is satisfactory for many practical purposes.

While the above description has been predicated on the application of the invention to echo ranging, it will be apparent that it is equally applicable to listening for underwater noises originating from ships, submarines and the like. In using the invention for listening to noise, i. e. sounds received directly from targets as distinguished from echoes of projected pulses, relay 15 would be disconnected from the circuit so that no pulse output from oscillator 13 would be projected by transmitter transducer 10. Relay 49 would likewise be taken out of the circuit to remove the time varied gain control from amplifier 35. Relay 64 would, however, continue to function so that for every complete stepping operation of the stepper mechanism 86, a new spiral sweep of the cathode-ray beam in oscilloscope 47 would be initiated. Continuously recurring sweeps of the beam would thus be produced. Thus, in this application as the underwater horizon is scanned continuously by the receiver transducer 16, each point being "looked at" four times per second, a persistent noise source will appear on the CRO face as a radial beam of varying width depending on the character of the noise, the excellence of noise transmission conditions and other factors. The beam is of such character that in practice it is possible for the operator to determine by the relative intensity the radial axis of the beam and thus estimate with a good degree of accuracy the bearing of the noise source.

In conclusion, it will be evident that various changes may be made in the present embodiment without departing from the spirit and scope of the invention as defined in the appended claims.

As used herein, the term "transducer" is intended to include any device capable of converting electrical energy into wave energy and vice versa.

Having thus fully described my invention, I claim:

1. Apparatus for determining the bearing of a target relative to a point in a field comprising omnidirectional transducer means at said point for emitting wave energy into said field for a predetermined period, directionally sensitive transducer means at said point for scanning said field at a rate correlated with the duration period of the emitted energy to pick up an echo of said energy as reflected by said target, a representation of said field, and indicator means for sweeping said representation synchronously with operation of said scanning transducer means and to produce an indication thereon when an echo is received corresponding to the bearing of said target.

2. Apparatus for determining the bearing of a target relative to a point in a field comprising omnidirectional transducer means at said point for emitting wave energy into said field for a predetermined period, said wave energy being emitted simultaneously in all directions in a selected plane, directionally sensitive transducer means at said point for scanning said field at a rate correlated with the duration period of the emitted energy to pick up an echo of said energy as reflected by said target, a representation of said field, and indicator means for sweeping said representation synchronously with operation of said scanning transducer means and to produce an indication thereon when an echo is received corresponding to the bearing of said target.

3. Apparatus for determining the bearing of a target relative to a point in a field comprising omnidirectional transducer means at said point for emitting wave energy into said field for a predetermined period, said wave energy being emitted simultaneously in all directions in a selected plane, directionally sensitive transducer means, means at said point for rotating the optimum receiving direction of last said transducer means at a rate correlated with the duration period of thte emitted energy for scanning said field to pick up an echo of said energy as reflected by said target, a representation of said field, and indicator means for sweeping said representation synchronously with operation of said scanning transducer means and to produce an indication thereon when an echo is received corresponding to the bearing of said target.

4. Apparatus for determining the bearing of a target relative to a point in a field comprising omnidirectional transducer means at said point for emitting wave energy into said field for a predetermined period, said wave energy being emitted simultaneously in all directions in a selected plane, directionally sensitive transducer means at said point and rotatable for scanning said underwater field at a rate correlated with the duration period of the emitted energy to pick up an echo of said energy as reflected by said target, a representation of said field, and indicator means rotatable synchronously with said scanning transducer means for sweeping said representation and to produce an indication thereon when an echo is received corresponding to the bearing of said target.

5. Apparatus for determining the bearing of a target relative to a point in a field comprising omnidirectional transducer means at said point for emitting wave energy into said field for a predetermined period, said wave energy being emitted simultaneously in all directions in a selected plane, directionally sensitive transducer means at said point, means for rotating the optimum receiving direction of said transducer means at a rate correlated with the duration period of the emitted energy for scanning said field to pick up an echo of said energy as reflected by said target, a cathode ray oscilloscope, means for sweeping the beam spot thereof synchronously with operation of said scanning transducer means, and means for brightening said beam spot when an echo of said wave energy is received whereby the angular position of said beam spot on the oscilloscope screen will indicate the bearing of said target.

6. Apparatus for determining the bearing and range of a target relative to a point in a field comprising omnidirectional transmitter transducer means at said point for emitting wave energy into said field for a predetermined period, directionally sensitive receiver transducer means at said point for scanning said field at a rate correlated with the duration period of the emitted energy to pick up an echo of said energy as reflected by said target, a representation of said field, and indicator means for periodically spirally sweeping said field representation synchronously with operation of said transmitter and receiver transducer means and to produce an indication thereon when an echo is received corresponding to the bearing and range of said target.

7. Apparatus for determining the bearing and range of a target relative to a point in a field comprising omnidirectional transmitter transducer means at said point for emitting wave energy into said field for a predetermined period, said wave energy being emitted simultaneously in all directions in a selected plane, directionally sensitive receiver transducer means at said point, means for rotating the optimum receiving direction of said receiver transducer means at a rate correlated with the duration period of the emitted energy for scanning said field to pick up an echo of said energy as reflected by said target, a representation of said field, and indicator means for periodically spirally sweeping said field representation synchronously with operation of said transmitter and receiver transducer means and to produce an indication thereon when an echo is received corresponding to the bearing and range of said target.

8. Apparatus for determining the bearing and range of a target relative to a point in a field comprising transmitter transducer means at said point for emitting a pulse of wave energy into said field, said wave energy being emitted simultaneously in all directions in a selected plane, directionally sensitive receiver transducer means at said point, means for rotating said receiver transducer means at a rate correlated with the duration period of the emitted energy pulse for scanning said field to pick up an echo of said energy as reflected by said target, a representation of said field and indicator means for spirally sweeping said field representation synchronously with operation of said transmitter and receiver transducer means and to produce an indication thereon when an echo is received corresponding to the bearing and range of said target.

9. Apparatus for determining the bearing and the range of a target relative to a point in a field comprising transmitter transducer means at said point, means for actuating said transducer means for emitting wave energy into said field for a predetermined period, said wave energy being emitted simultaneously in all directions in a horizontal plane, directionally sensitive receiver transducer means, means for rotating the optimum receiving direction of said receiver transducer means for scanning said field to pick up an echo of said energy as reflected by said target, a representation of said field, indicator means for producing an indication on said field representation when an echo is received, and means for subjecting said indicator means to a rotating and expanded from-center sweep, the timing of said sweep being synchronized with operation of said transmitter transducer means and the turns thereof being synchronized with operation of said receiver transducer means.

10. Apparatus for determining the bearing and range of a target relative to a point in a field comprising transmitter transducer means at said point for emitting wave energy into said field for a predetermined period, said wave energy being emitted simultaneously in all directions in a selected plane, directionally sensitive receiver transducer means at said point, means for rotating the optimum receiving direction of said receiver transducer means for scanning said field to pick up an echo of said energy as reflected by said target, a cathode ray oscilloscope, means for subjecting the beam spot thereof to a rotating and expanded from-center sweep, the timing of said sweep being synchronized with operation of said transmitter transducer means and the turns thereof being synchronized with operation of said receiver transducer means, and means for brightening said beam spot when an echo of said wave energy is received whereby the angular position of said beam spot on the oscilloscope screen will indicate the bearing of said target and the radial distance of said beam spot from the screen center will indicate the target range.

11. Apparatus for determining the bearing and range of a target relative to a point in a field comprising transmitter transducer means at said point for emitting a pulse of wave energy into said field, said wave energy being emitted simultaneously in all directions in a selected plane, directionally sensitive receiver transducer means rotatable at a rate correlated with the duration period of the emitted energy pulse for scanning said field to pick up an echo of said energy as reflected by said target, a cathode ray oscilloscope, means for subjecting the beam spot thereof to a rotating and expanded from-center sweep, the timing of said sweep being synchronized with operation of said transmitter transducer means and the turns thereof being synchronized with rotation of said receiver transducer means, and means for brightening said beam spot when an echo of said wave energy is received whereby the angular position of said beam spot will indicate the bearing of said target and the radial distance of the beam spot from the center will indicate the target range.

12. Apparatus for determining the bearing and range of an underwater target relative to a point comprising a first underwater transducer at said point for emitting compressional wave energy simultaneously in all directions in a horizontal plane, means for actuating said transducer for a predetermined period, a second underwater transducer at said point for receiving echoes of said wave energy from said target, said second transducer being most sensitive along an axis normal to the active face thereof, means for rotating said second transducer at a rate correlated with the period that said first transducer is actuated, a cathode ray oscilloscope, means for subjecting the beam spot thereof to a spiral sweep, the timing of said sweep being synchronized with operation of first said transducer and the turns thereof being synchronized with rotation of second said transducer, and means for brightening said beam spot when an echo of said wave energy is received, whereby the angular position of the beam spot on the oscilloscope screen will indicate the bearing of said target and the radial distance of the beam spot from the screen center will indicate the target range.

OSCAR HUGO SCHUCK.

REFERENCES CITED

The following references are of record in the file of this patent:

UNITED STATES PATENTS

| Number | Name | Date |
|---|---|---|
| 1,836,397 | Rieber | Dec. 25, 1931 |
| 1,973,673 | Rice | Sept. 11, 1934 |
| 2,130,913 | Tolson | Sept. 20, 1938 |
| 2,231,929 | Lyman | Feb. 18, 1941 |

FOREIGN PATENTS

| Number | Country | Date |
|---|---|---|
| 406,903 | Great Britain | Mar. 8, 1934 |
| 497,147 | Great Britain | Dec. 9, 1938 |
| 546,202 | Great Britain | July 2, 1942 |
| 703,148 | France | Apr. 25, 1931 |